(12) United States Patent (10) Patent No.: US 9,402,226 B2
Abraham et al. (45) Date of Patent: Jul. 26, 2016

(54) STATION, METHOD, AND APPARATUS FOR NETWORK DETECTION IN A WIRELESS COMMUNICATIONS SYSTEM

(71) Applicant: QUALCOMM, Incorporated, San Diego, CA (US)

(72) Inventors: Santosh Paul Abraham, San Diego, CA (US); George Cherian, San Diego, CA (US); Jouni Kalevi Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 14/061,497

(22) Filed: Oct. 23, 2013

(65) Prior Publication Data

US 2014/0133394 A1 May 15, 2014

Related U.S. Application Data

(60) Provisional application No. 61/725,404, filed on Nov. 12, 2012.

(51) Int. Cl.
*H04W 4/00* (2009.01)
*H04W 48/16* (2009.01)
*H04W 48/14* (2009.01)

(52) U.S. Cl.
CPC .............. *H04W 48/16* (2013.01); *H04W 48/14* (2013.01)

(58) Field of Classification Search
CPC ..... H04W 48/00; H04W 48/08; H04W 48/16; H04W 48/17; H04W 48/18; H04W 48/20
USPC .................................................. 370/310–350
See application file for complete search history.

(56) References Cited

U.S. PATENT DOCUMENTS

| 8,451,771 | B2 | 5/2013 | Hedayat et al. |
| 2007/0133447 | A1 | 6/2007 | Wentink |
| 2008/0056211 | A1* | 3/2008 | Kim ................... H04L 29/12839 370/338 |
| 2008/0080432 | A1 | 4/2008 | Lu et al. |
| 2008/0299966 | A1* | 12/2008 | Masuda ..................... 455/432.1 |
| 2011/0149941 | A1* | 6/2011 | Gong et al. ................... 370/343 |
| 2012/0278687 | A1* | 11/2012 | Sharon et al. ................. 714/790 |
| 2013/0170345 | A1 | 7/2013 | Merlin et al. |
| 2013/0229963 | A1 | 9/2013 | Asterjadhi et al. |
| 2014/0010089 | A1* | 1/2014 | Cai et al. ........................ 370/241 |
| 2014/0347985 | A1* | 11/2014 | Yi .......................... H04W 76/02 370/230 |

* cited by examiner

*Primary Examiner* — Ricky Ngo
*Assistant Examiner* — Wei-Po Kao
(74) *Attorney, Agent, or Firm* — Knobbe, Martens, Olson & Bear, LLP

(57) ABSTRACT

A station, method, and apparatus for network detection in a wireless communication system are provided. One implementation may include a station for identifying the presence of at least one access point to associate with. The station comprises a processor configured to generate a probe message, the probe message including a scrambling seed. The processor is further configured to transmit the probe message. The processor is further configured to receive a first probe response message from each access point, the first probe response message being encoded with the scrambling seed. The processor is further configured to receive the second probe response message from each of the access points, the second probe response message from each of the access points including at least an address of the access point. The processor is further configured to identify an access point to associate with based on the second probe response messages. The processor is further configured to generate an association request to transmit to the identified access point. The processor is further configured to transmit the association request to the identified access point.

12 Claims, 8 Drawing Sheets

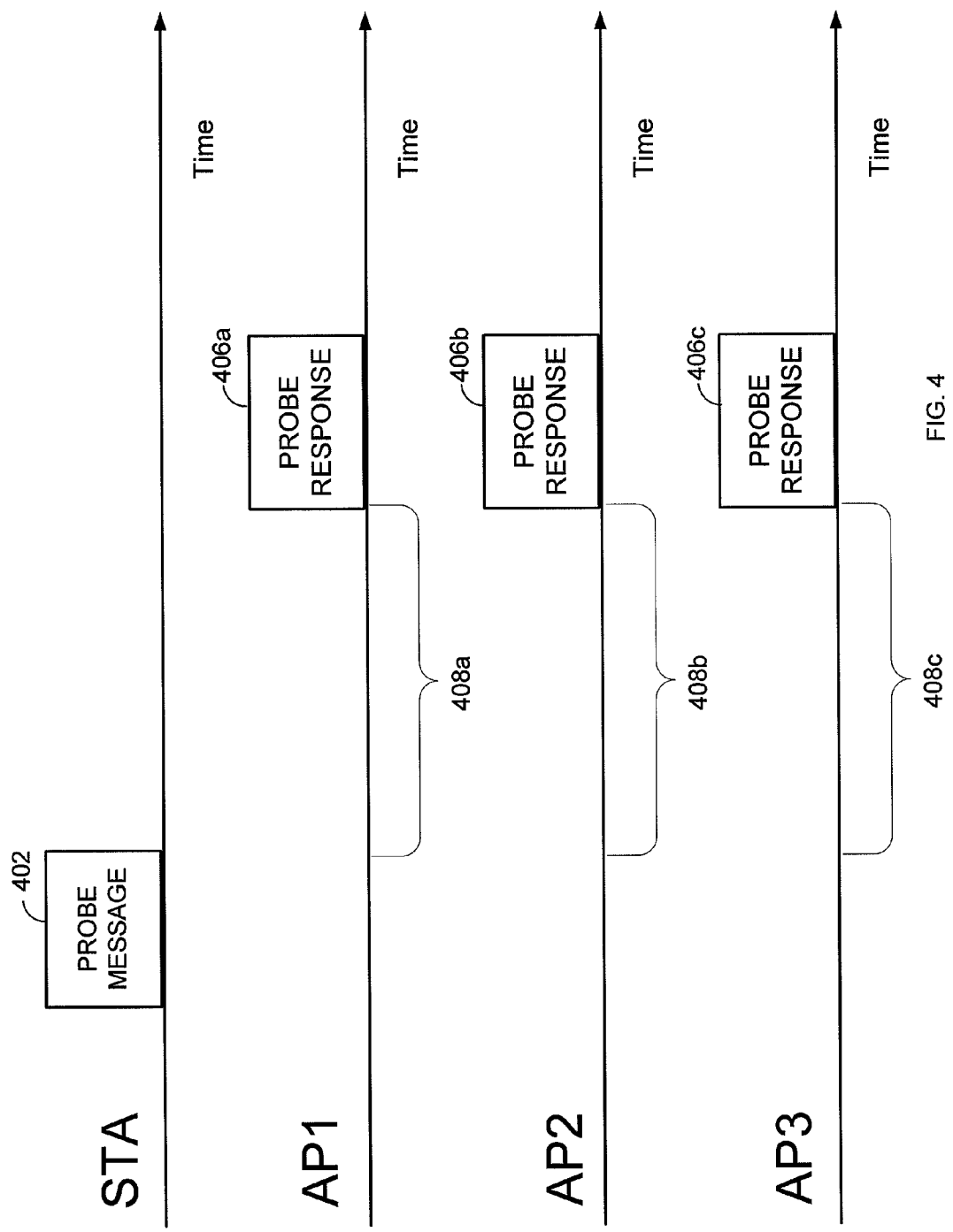

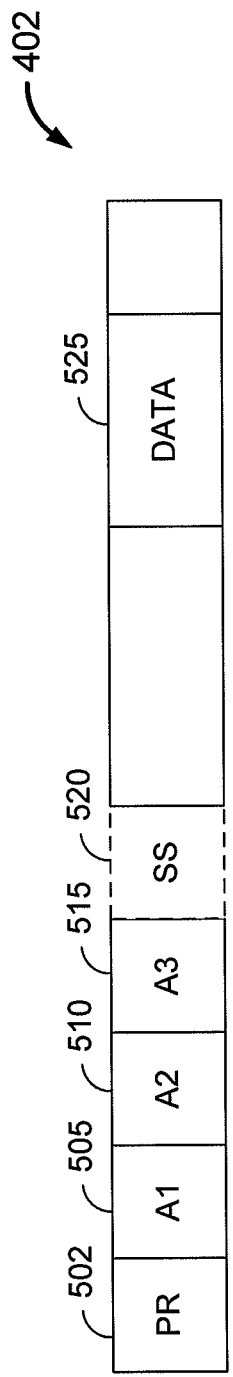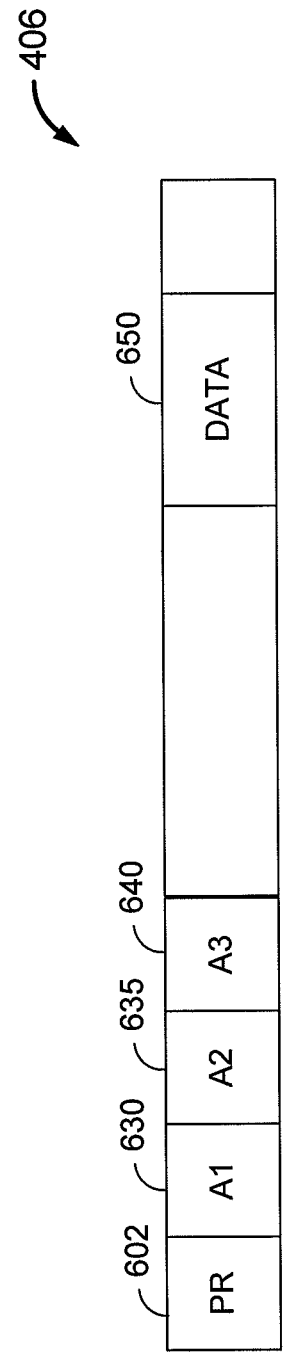

STATION, METHOD, AND APPARATUS FOR NETWORK DETECTION IN A WIRELESS COMMUNICATIONS SYSTEM

CROSS-REFERENCE TO RELATED APPLICATIONS

This application claims priority to U.S. Provisional Patent Application No. 61/725,404, which is entitled "SYSTEMS AND METHODS FOR NETWORK DETECTION IN A WIRELESS COMMUNICATION SYSTEM" filed Nov. 12, 2012, assigned to the assignee hereof, and the entirety of which is incorporated herein by reference.

TECHNICAL FIELD

The present application relates generally to wireless communications, and more specifically to a station, method, and apparatus for network detection in a wireless communication system.

BACKGROUND

In many telecommunication systems, communications networks are used to exchange messages among several interacting spatially-separated devices. Networks may be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include, among other things, fast access point discovery, etc.

A station for identifying the presence of at least one access point to associate with is provided. The station comprises a processor configured to generate a probe message, the probe message including a scrambling seed. The process is further configured to transmit the probe message. The process is further configured to receive a first probe response message from each access point, the first probe response message being encoded with the scrambling seed. The process is further configured to receive the second probe response message from each of the access points, the second probe response message from each of the access points including at least an address of the access point. The process is further configured to identify an access point to associate with based on the second probe response messages. The process is further configured to generate an association request to transmit to the identified access point. The process is further configured to transmit the association request to the identified access point.

A method for identifying the presence of at least one access point to associate with is provided. The method comprises generating a probe message, the probe message including a scrambling seed. The method further comprises transmitting the probe message. The method further comprises receiving a first probe response message from each access point, the first probe response message being encoded with the scrambling seed. The method further comprises receiving the second probe response message from each of the access points, the second probe response message from each of the access points including at least an address of the access point. The method further comprises identifying an access point to associate with based on the second probe response messages. The method further comprises generating an association request to transmit to the identified access point. The method further comprises transmitting the association request to the identified access point.

An apparatus for identifying the presence of at least one access point to associate with is provided. The apparatus comprises means for generating a probe message, the probe message including a scrambling seed. The apparatus further comprises means for transmitting the probe message. The apparatus further comprises means for receiving a first probe response message from each access point, the first probe response message being encoded with the scrambling seed. The apparatus further comprises means for receiving the second probe response message from each of the access points, the second probe response message from each of the access points including at least an address of the access point. The apparatus further comprises means for identifying an access point to associate with based on the second probe response messages. The apparatus further comprises means for generating an association request to transmit to the identified access point. The apparatus further comprises means for transmitting the association request to the identified access point.

BRIEF DESCRIPTION OF THE DRAWINGS

FIG. 4 is a flow diagram showing an exchange of messages for detecting access points in a wireless communication system in accordance with an embodiment.

FIG. 5 is a diagram of an exemplary probe message in accordance with an embodiment.

FIG. 6 is a diagram of an exemplary probe response message in accordance with an embodiment.

DETAILED DESCRIPTION

Figure 1A:
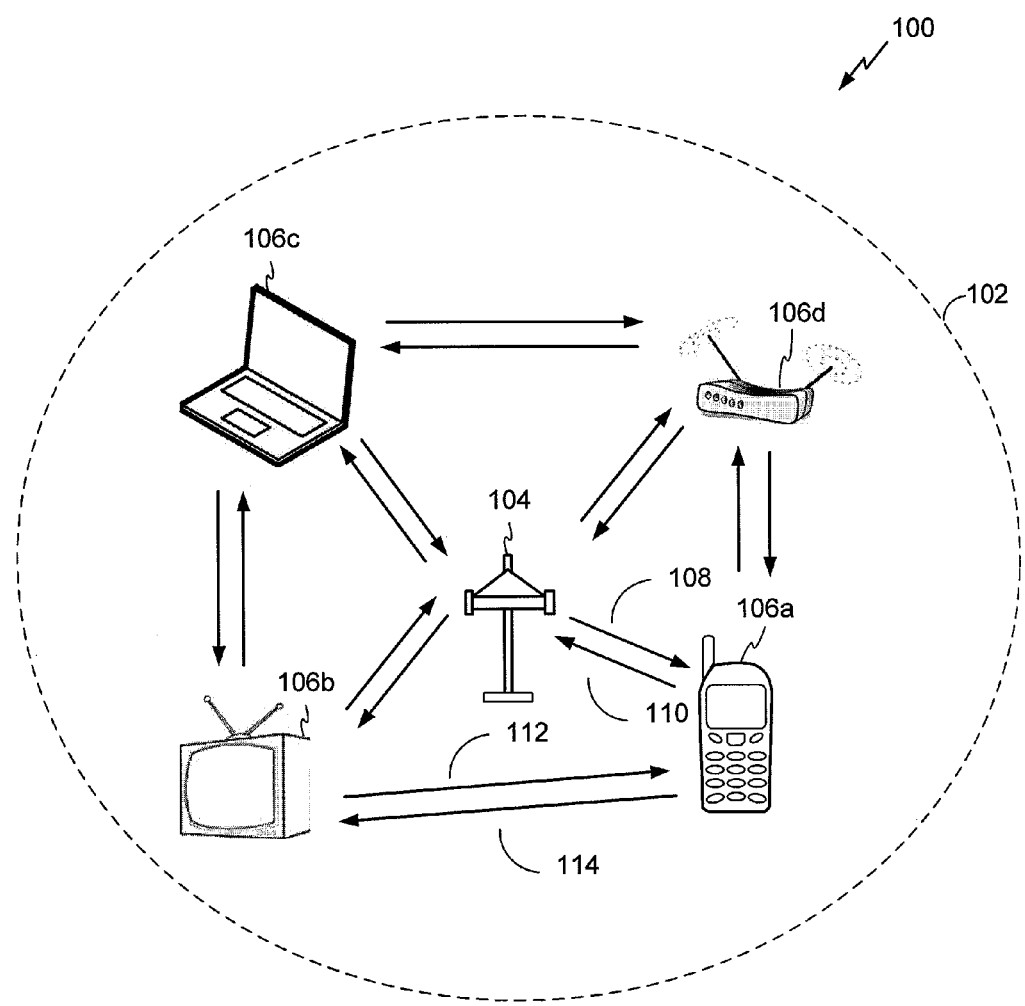
FIG. 1A illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art may appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It may be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations or "STAs"). In general, an AP may serve as a hub or base station for the WLAN, and a STA serves as a user of the WLAN. For example, a STA may be a laptop computer, a personal digital assistant (PDA), a mobile phone, etc. As an example, a STA may connect to an AP via a WiFi (e.g., IEEE 802.11 protocol) compliant wireless link to obtain general connectivity to the Internet or to other wide area networks. In some implementations, a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1A illustrates an example of a wireless communication system 100 in which aspects of the present disclosure may be employed. The wireless communication system 100 may operate pursuant to a wireless standard, such as an 802.11 standard. The wireless communication system 100 may include an AP 104, which communicates with STAs (e.g., 106a, 106b, 106c, 106d, etc.). In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c; although, this communication link is not illustrated in FIG. 1.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, the downlink 108 may be referred to as a forward link or a forward channel, and the uplink 110 may be referred to as a reverse link or a reverse channel.

A communication link may be established between STAs. Some possible communication links between STAs are illustrated in FIG. 1. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs associated with the AP 104 and that use the AP 104 for communication may be referred to as a basic service set (BSS).

The wireless communication system 100 may not have a central AP 104, but rather may function as a peer-to-peer network between the STAs. Accordingly, the functions of the AP 104 described herein may alternatively be performed by one or more of the STAs.

Figure 1B:
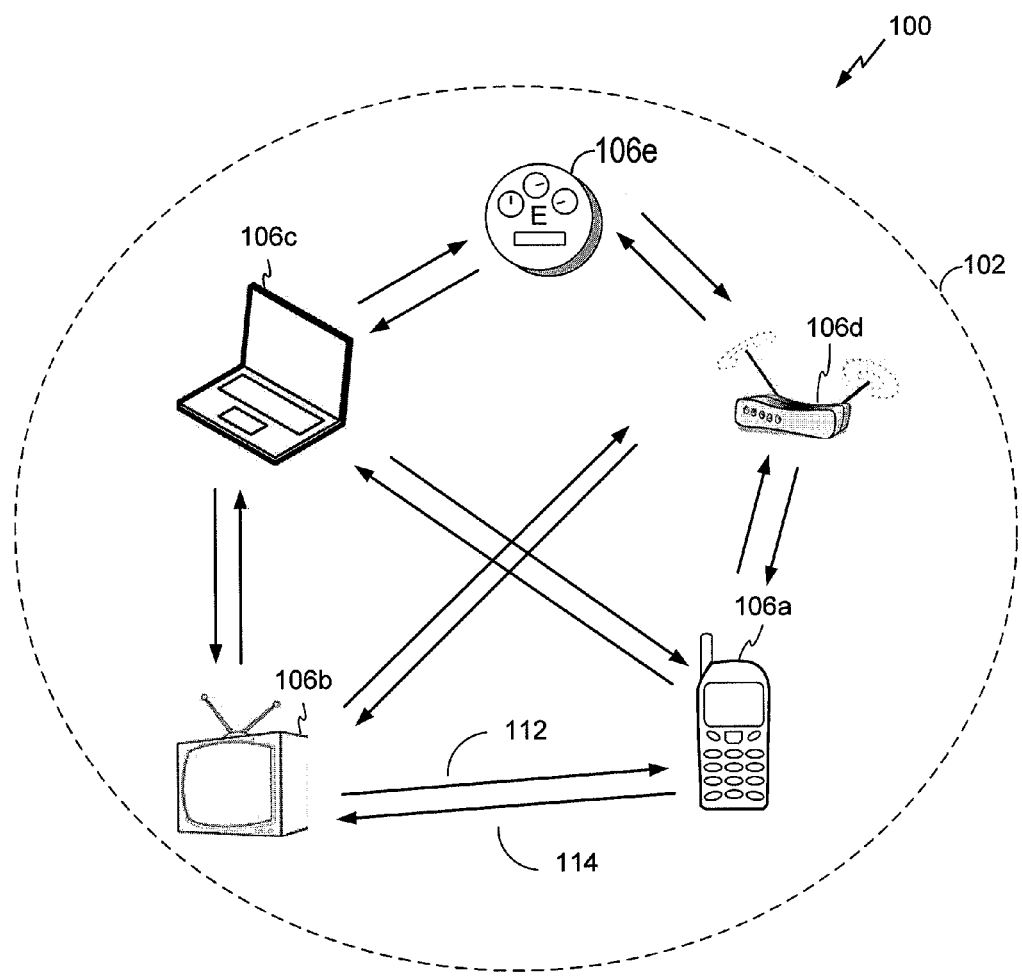
FIG. 1B illustrates another example of a wireless communication system in which aspects of the present disclosure may be employed.

FIG. 1B illustrates an example of a wireless communication system 100 that may function as a peer-to-peer network, in which aspects of the present disclosure may be employed. For example, the wireless communication system 100 shown in FIG. 1B shows STAs, 106a, 106b, 106c, 106d, and 106e that may communicate with each other without the presence of an AP. As such, the STAs, 106a, 106b, 106c, 106d, and 106e may be configured to communicate in different ways to coordinate transmission and reception of messages to prevent interference and accomplish various tasks. In one aspect, the network shown in FIG. 1A or 1B may configured as a "near-me area network" (NAM). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

Figure 2:
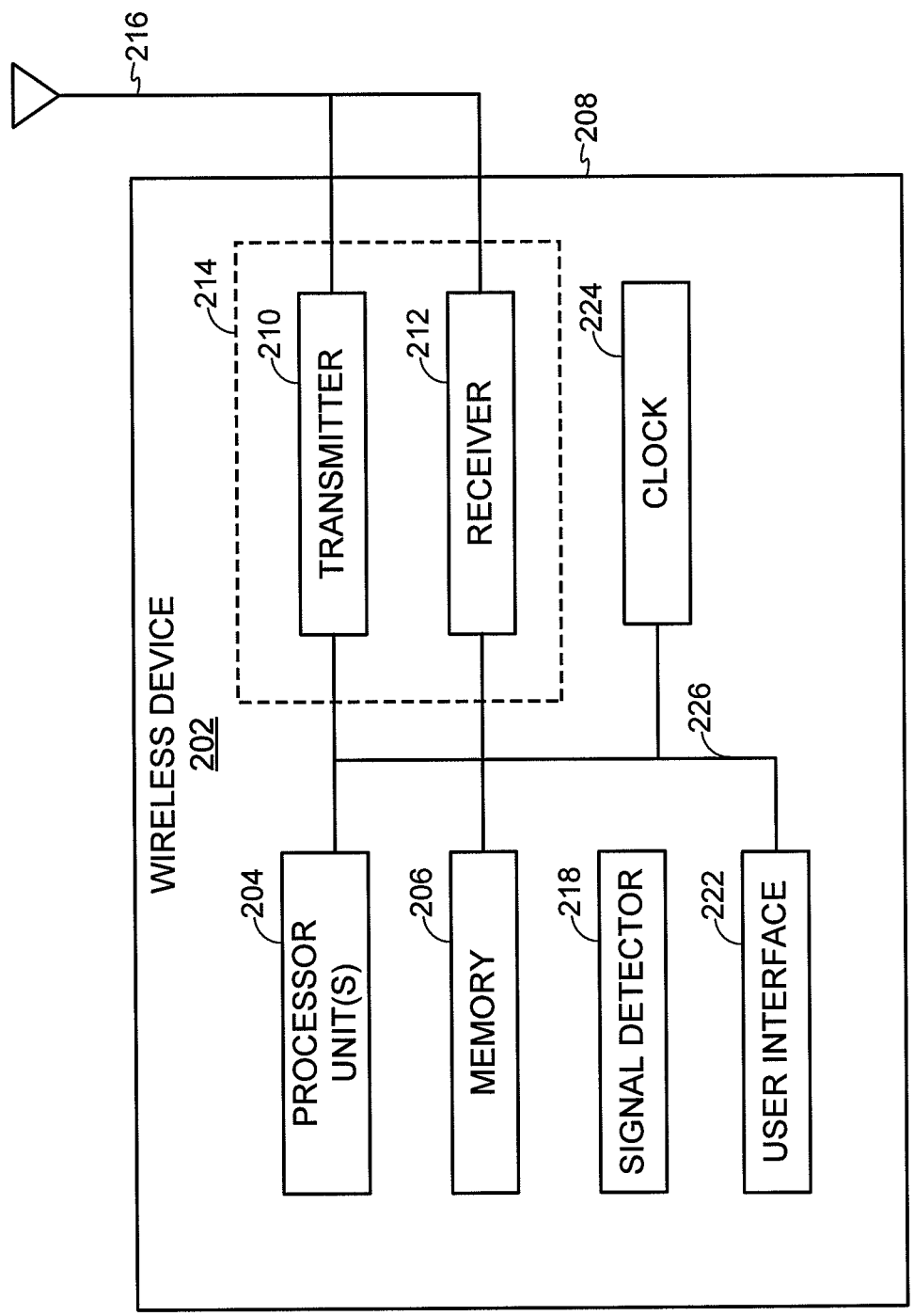
FIG. 2 illustrates a functional block diagram of a wireless device that may be employed within either of the wireless communication systems of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). The wireless device 202 may also include a memory 206, which may include both read-only memory (ROM) and random access memory (RAM), may provide instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described herein. In addition, the wireless device 202 may include a clock 224 configured to generate a clock signal to coordinate and synchronize activities of the wireless device 202. In some configurations, the processor 204 may include the clock 224. The processor 204 may be configured to update the clock 224 with a time value to allow for synchronization with other wireless devices.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may also implement the functionality described above with respect to the signal detector 218 and/or the DSP 220. Further, each of the components illustrated in FIG. 2 may be implemented using a plurality of separate elements.

Devices, such as a group of STAs, 106a, 106b, 106c, 106d, and 106e shown in FIG. 1B, may be used for neighborhood aware networking, or social-WiFi networking. For example, various stations within the network may communicate on a device to device (e.g., peer-to-peer communications) basis with one another regarding applications that each of the STAs supports. A discovery protocol may be used in a social-WiFi network to enable STAs to advertise themselves (e.g., by sending discovery packets) as well as discover services provided by other STAs (e.g., by sending paging or query packets), while ensuring secure communication and low power consumption. Furthermore, at least a portion of the discovery protocol may be related to coordinating and/or synchronizing activities of the STAs. A discovery packet may also be referred to as a discovery message or a discovery frame. A paging or query packet may also be referred to as a paging or query message or a paging or query frame.

Furthermore, to ensure proper communication between multiple STAs, STAs may require information regarding characteristics of other STAs. For example, the STA 106 may require timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly the DSP 220 and the signal detector 218 of the STA 106 may operate using reduced power consumption in the doze state. Further, in the power-save mode, the STA 106 may occasionally enter the awake state to listen to messages from the AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3A:
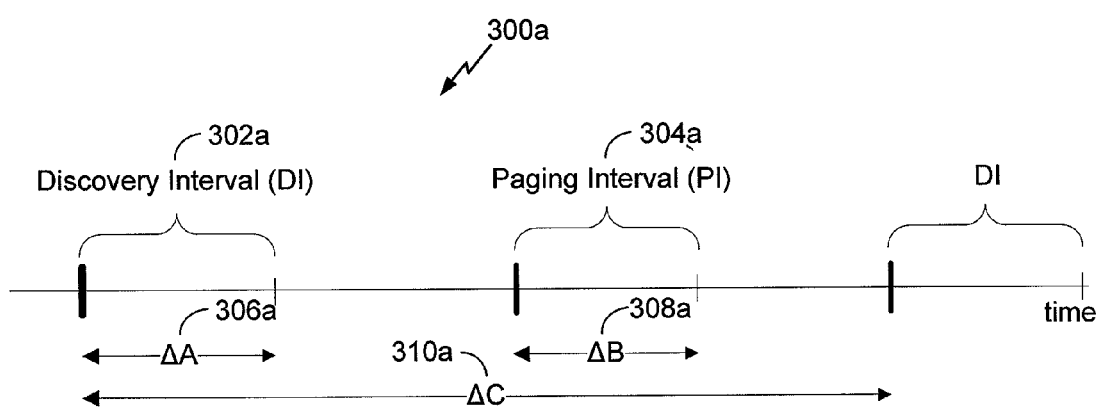
FIG. 3a illustrates an exemplary communication timeline in a wireless communication system in accordance with aspects of the present disclosure.

FIG. 3A illustrates an exemplary communication timeline 300a in a wireless communication system where STAs (e.g., the STAs 106a, 106b, 106c, 106d, etc. of FIG. 1) may communicate via one channel. In one embodiment, the communication according to the timeline shown in FIG. 3A may be used in a peer-to-peer wireless network, such as the network shown in FIG. 1B. The exemplary communication timeline 300a may include a discovery interval (DI) 302a of a time duration $\Delta A$ 306a, a paging interval (PI) 304a of a time duration $\Delta B$ 308a, and an overall interval of a time duration $\Delta C$ 310a. In some aspects, communications may occur via other channels as well. Time increases to the right across the time axis.

During the DI 302a, APs or STAs may advertise services through broadcast messages such as discovery packets. APs or STAs may listen to broadcast messages transmitted by other APs or STAs. In some aspects, the duration of the DI may vary over time. In other aspects, the duration of the DI may remain fixed over a period of time. The end of the DI 302a may be separated from the beginning of the subsequent PI 304a by a first remainder period of time as illustrated in FIG. 3a. The end of the PI 304a may be separated from the beginning of a subsequent DI by a different remainder period of time as illustrated in FIG. 3a. However, different combinations of remainder time periods are contemplated.

During the PI 304a, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI 304a may vary over time. In other aspects, the duration of the PI 304a may remain constant over a period of time. In some aspects, the duration of the PI 304a may be less than the duration of the DI 302a.

The overall interval of duration $\Delta C$ 310a may measure the period of time from the beginning of one DI to the beginning of a subsequent DI as illustrated in FIG. 3a. In some aspects, the duration of the overall interval 310a may vary over time. In other aspects, the duration of the overall interval 310a may remain constant over a period of time. At the conclusion of the overall interval 310a, another overall interval may begin, including a DI, a PI, and the remainder intervals. Consecutive overall intervals may follow indefinitely or continue for a fixed period of time.

A STA (e.g., the STAs 106a, 106b, 106c, 106d, etc. of FIG. 1) may enter a sleep or power-save mode when the STA is not transmitting or listening or is not expecting to transmit or listen. As an example, the STA may sleep during periods other than the DI 302a or the PI 304a. The STA in the sleep mode or power-save mode may awake or return to normal operation or full power mode at the beginning of the DI 302a or the PI 304a to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI 302a, APs or STAs may transmit discovery packets (DPs). During the PI 304a, APs or STAs may transmit paging request packets (PRs). A DP may be a packet configured to advertise a plurality of services provided by a STA or AP and to indicate when the paging interval 304a is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI 302a and the PI 304a may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI 302a or the PI 304a. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awaken or remain awake during the PI and process paging request packets to determine if a particular paging request packet indicates interest by another device in at least one of a plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information, with another device outside of the DI or PI. In some aspects, the STA may enter the sleep or power-save mode until the beginning of the next DI.

As examples, the duration AC of the overall interval 310a may equal approximately one to five seconds in some aspects. In other aspects, the overall interval 310a may be less than one second or more than five seconds. The duration ΔA 306a of the DI 302a may equal approximately 16 milliseconds in some aspects while more or less than 16 milliseconds in other aspects. The duration ΔB 308a of the PI 304a may equal approximately the duration ΔA 306a in some aspects. In other aspects, the duration ΔB 308a may be more or less than the duration ΔA 306a.

Figures 3B, 3C:
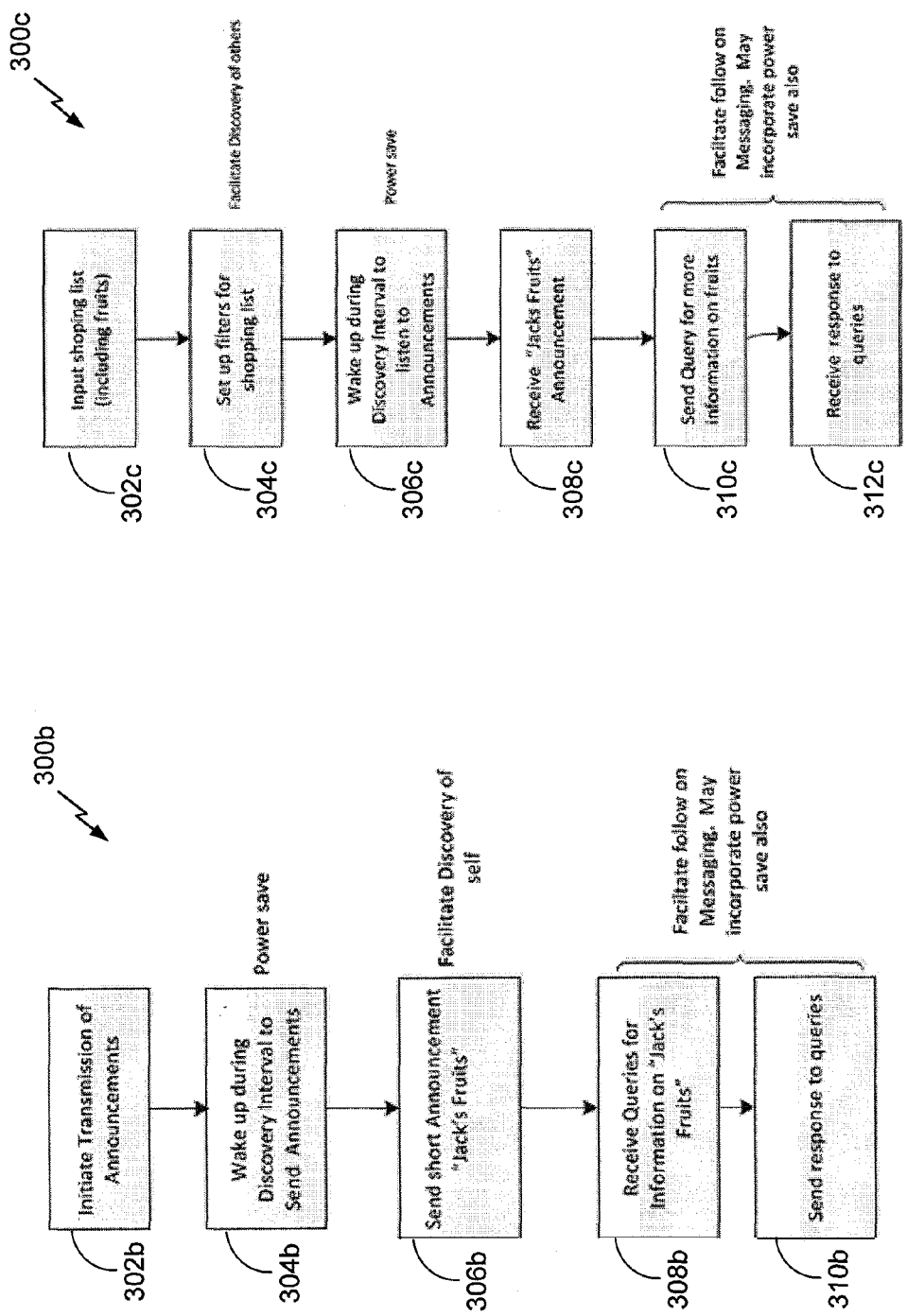
FIG. 3b is a flowchart of an exemplary process of discovering devices in a wireless communication system in accordance with aspects of the present disclosure.
FIG. 3c is a flowchart of an exemplary process of querying devices in a wireless communication system in accordance with aspects of the present disclosure.

FIG. 3b is a flowchart of an exemplary process 300b of discovering devices in a wireless communication system. The process 300b may be used to introduce two devices, such as two STAs (e.g., two of the STAs 106a, 106b, 106c, 106d, etc. of FIG. 1). For example, a STA may advertise information about one or more of a plurality of services that may be of interest to various other STAs to which the information is directed. In some embodiments, a service offered by a STA may include a service offered by an application (e.g., a gaming application, a shopping application, a social networking application, etc.) that a user has downloaded or that is native to the STA. For example, a user of the STA may want to invite other users of the application to interact with the user via the application. At block 302b, the STA may initiate transmission of announcements. Each announcement may include a discovery packet (as described in connection with FIG. 3A) or message including the information relating to the one or more services. At block 304b, the STA may wake up from a power-save mode or sleep mode during a discovery interval to send announcements to one or more STAs. At block 306b, the STA may send one or more short announcements regarding a particular service, such as "Jack's Fruits," in order to facilitate discovery of the STA. The short announcements may include a discovery packet or message. The receiving STAs that are interested in the one or more services advertised by the STA may respond with a paging request (or query request) packet or message that indicates interest in the service provided by the STA. At block 308b, the STA may receive queries (e.g., a paging or query request) for information on the particular service, such as "Jack's Fruits." In response, at block 310b, the STA may send a response to the queries. "Follow on messaging" between the STA and the various querying STAs may occur. The STA and the various STAs may enter power-save mode or sleep mode in the intervals between the exchanges of messages between the STAs. The receiving may be performed by receiver 212 or the transceiver 214, for example, and the transmitting may be performed by the transmitter 210 or the transceiver 214, for example.

FIG. 3c is a flowchart of an exemplary process 300c of querying devices in a wireless communication system in accordance with aspects of the present disclosure. At block 302c, a STA may input a shopping list, which may include various vendors that a user of the STA may have an interest. For example, a user may download a shopping list from the Internet. Although the process 300c is described with respect to a shopping application, those having ordinary skill in the art will appreciate that the process 300c may apply to other applications, such as gaming applications, social networking applications, etc. At block 304c, the STA may set up filters for the shopping list. For example, a filter may be set up to allow the STA to wake up from a power-save mode or sleep mode when a discovery packet or message is received for particular vendors or applications. At block 306c, the STA may wake up during a discovery interval to listen to announcements. Each announcement may include a discovery packet or message including information relating to one or more services offered by one or more other STAs. At block 308c, the STA may receive an announcement from a second STA, such as a "Jack's Fruits" announcement. The STA may determine whether it is interested in one or more sets of information related to the announcement and may respond with a paging request (or query request) packet or message that indicates its interest in the information. For example, if the STA is interested in a particular sale item offered by the second STA, the STA may respond with a paging request (or query request) packet or message. At block 310c, the STA sends a query for more information relating to the announcement, such as more information on Jack's Fruits. At block 312c, the STA may receive a response to one or more queries that the STA sent to other STAs regarding services offered by the other STAs.

Before the above discovery process may be started, when a STA 106 first enters or wishes to communicate within a network, the STA may not know what other STAs or APs 104 are already established within the network. Techniques described in further detail below may be used in a network where the discovery process described above is not in use and may be used in any network where a STA 106 desires to discover one or more APs. In some embodiments, a STA 106 may transmit a "probe" message on a channel to determine, for example, if there are any APs on the channel. There may be multiple APs on the channel. In one aspect, the probe message may be sent to a multicast address. The STA 106 thereafter detects a response from one or more APs by monitoring the medium on the channel for a surge in energy on the wireless link indicating a response. If the surge is detected, then the STA 106 sends out a probe request and waits for probe responses. However, if there is no surge, then the STA 106 would decide that there are no APs on the channel and move to another channel.

However, in some cases, detecting presence of a network based on a detection of an increase in energy may increase the likelihood of false alarms, for example as random surges of energy on a channel may be construed as a signal. Furthermore, when multiple devices (e.g., STAs 106) responds to the transmission, an MPDU portion of the collided frames received may not be able to be decided since the transmission from multiple devices would collide. As such, a STA 106 may not be able to determine that the response frame it received is in response to the probe message it sent. As such, certain embodiments are directed to improving the transmission and responses to probe messages and responses to allow for improved network discovery and use of network resources.

FIG. 4 is a flow diagram showing an exchange of messages for detecting at least one of, for example, a plurality of access points in a wireless communication system in accordance with an embodiment. In an exemplary embodiment, a STA (e.g., the STAs 106*a*, 106*b*, 106*c*, 106*d*, etc. of FIG. 1) may utilize this exchange of messages to identify the presence of at least one access point (e.g., the AP 104) to associate with. As is further described below, the exchange of messages that will be described with reference to FIG. 4 allows, in one aspect, for MPDUs transmitted from multiple different APs to be decoded.

As demonstrated in FIG. 3, a STA 106 may desire to detect a network and/or any APs on the network on a channel. To accomplish this, as shown in FIG. 4, the processor (e.g., the processor 204 of FIG. 2) of the STA 106 may generate and transmit a probe message 402. As further described below, the probe message 402 may include a scrambling seed. In an embodiment, the probe message 402 may be a request-to-send (RTS) message (e.g., include an RTS frame). In one embodiment, the RTS frame may comprise a destination address corresponding to a pre-defined address for scanning a channel. In another embodiment, the probe message 402 may further include an identifier of the STA (e.g., the STA 106). The processor may then transmit the probe message 402.

In response to the probe message 402, after a time offset 408, the processor 204 of the STA may receive a first probe response message 406 (e.g., 406*a*, 406*b*, 406*c*, etc.) (as further described below in connection with FIG. 6) from the APs (AP1, AP2, and AP3) (e.g., the AP 104). In one embodiment, the first probe response message 406 may be encoded with the scrambling seed, as further described below. In another embodiment, the first probe response message 406 may further include the identifier of the station. In an embodiment, the time offsets 408*a*, 408*b*, 408*c* may be substantially the same such that each AP (AP1, AP2, and AP3) may respond to the probe message 402 at substantially the same time after reception of the probe message 402. Furthermore, in an embodiment, the physical layer waveform of the PPDU that comprises the first probe response message 406*a*, 406*b*, and 406*c* may be substantially identical for all of the APs that respond to the probe message 402. Hereinafter, time offsets 408*a*, 408*b*, and 408*c* are referred to herein as time offset 408. In an embodiment, the time offset 408 may be pre-determined and known to all APs prior to receiving any probe messages. As such, when the AP receives the probe message 402, the AP may respond after the known time offset 408 so that all of the APs may send their probe responses substantially at the same time. In a further embodiment, the time offset 408 may be sent within the probe message 402. As such, each of the APs (AP1, AP2, and AP3) may decode the probe message 402, determine the time offset 408 from the probe message 402, and transmit the probe responses 406*a*, 406*b*, and 406*c* substantially all at the same time using the time offset 408.

As discussed above, in an embodiment, the physical layer waveform of the PPDU that comprises the first probe response message 406*a*, 406*b*, and 406*c* may be substantially identical for all of the APs that respond to the probe message 402. Accordingly, in an embodiment, each AP 104 (AP1, AP2, and AP3) may generate an MPDU including a substantially identical set of bits. One portion of the set of bits may be the address or other identifier of the sender (e.g., STA 106) of the probe message 402. This address or other identifier may be copied from the probe message 402. In an embodiment, the bits of the MPDUs are scrambled using a common scrambling seed. In one embodiment, the scrambling seed may be a value that is pre-determined and known to all of the APs prior to receiving any probe messages from a STA 106. In another embodiment, the scrambling seed may be derived from a pre-known transformation of the probe message 402 or address within the probe message 402 received from the STA 106. In another embodiment, the scrambling seed may be included within the probe message 402. As such, the APs may decode the probe message 402, determine the scrambling seed from the probe message 402, and transmit the probe response 406*a*, 406*b*, or 406*c* using the determined scrambling seed. In another embodiment, the processor 204 of the STA 106 may be further configured to generate the scrambling seed using a standardized transformation of the probe message 402 or a STA address.

After receiving the first probe response message 406, the processor 204 of the STA (e.g., the STA 106) may be further configured to receive a second probe response message from each of the APs (AP1, AP2, and AP3). In one embodiment, the second probe response message from each of the APs may include at least an address of the AP from which it was sent, as further described below. In an embodiment, the second probe response message may include at least one of a clear-to-send (CTS) message (e.g., frame), an acknowledgement (ACK) frame, and a PHY layer preamble. In an embodiment, the PHY layer preamble may comprise a length field set to zero.

After receiving the second probe response messages, the processor 204 of the STA (e.g., the STA 106) may be further configured to identify an AP to associate with based on the second probe response messages. The processor 204 of the STA may then generate and transmit an association request to the identified AP.

FIG. 5 is a diagram of an exemplary probe message 402 (e.g., the probe message 402 of FIG. 4) in accordance with an embodiment. The probe message 402 may include a preamble 502 including preamble data along with address information 505, 510, and 515. For example, the address information may include the address of a STA 106 transmitting the preamble data. In addition, the preamble may include a multicast address for indicating a destination address of one or more APs 106 that may be able to decode and process the probe message 402. In addition, in accordance with an embodiment, the probe message 402 may include a scrambling seed (or sequence) 520 that may be used by a receiving AP 104 to generate a response message (e.g., the first probe response message 406 as described in connection with FIG. 4). In other embodiments, the scrambling seed 520 may not be transmitted and may be pre-known by the APs. In some cases, a data 525 may also be transmitted. In an embodiment, the probe message 402 may include a request-to-send (RTS) frame. The destination address of the RTS frame may be a standardized or otherwise defined address for scanning a channel.

FIG. 6 is a diagram of an exemplary probe response message 406 (e.g., the first probe response message 406 or the second probe response message of FIG. 4) in accordance with an embodiment. The probe response message 406 may be transmitted by an AP 104 in response to receiving the probe message 402. The probe response message 406 may include a preamble 602 along with address information 630, 635, and 640 in some cases. In addition, the probe response message 406 may include other data 650. In some cases, the probe response message 406 may be an MPDU message including a sequence of bits that are scrambled using a scrambling seed.

The sequence of bits may include the address of the STA 106 sending the probe message 402. In an embodiment, and as described above, the response message 406 may be a clear-to-send (CTS) message transmitted in response to the RTS message forming the probe message 402. In another embodiment, the response message 406 may be an ACK frame. In another embodiment, the response message 406 may be a PHY layer preamble with a length field set to zero.

For example, a wireless device 202 configured as a STA 106 may transmit the probe message 402. In one aspect, a transmitter 210 may transmit the probe message 402. The response message 406 may be received from one or more devices encoded using the transmitted scrambling seed. In one aspect, a receiver 212 may receive the response message 406.

According to aspects of the embodiment above, a STA 106 receiving the response message 406 after transmitting the probe message 402 may be able to determine the authenticity of the response message 406 transmitted simultaneously by multiple APs. For example, based on the scrambling sequence a response message 303 received from multiple APs may be able to be decoded and the STA 106 can verify that its address was included in the response message 406. This may allow for reducing false positives of the response message 406 and allow the STA 106 to receive multiple responses simultaneously.

Figure 7:
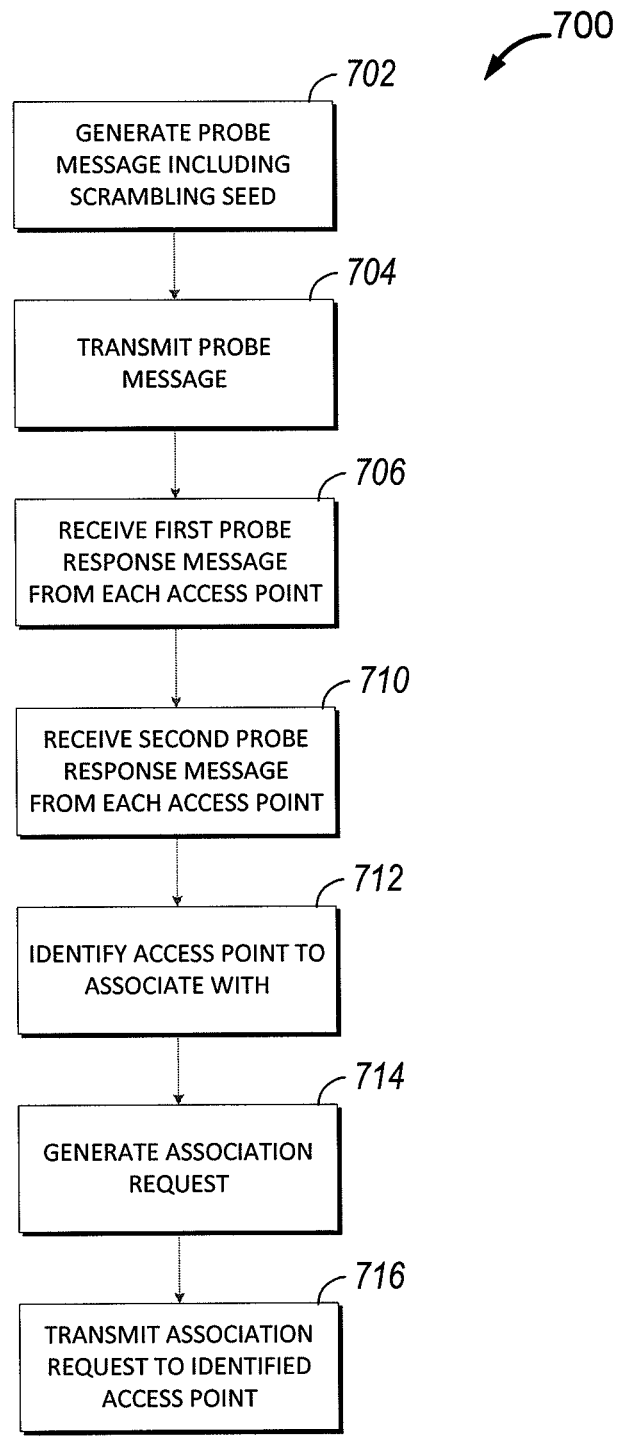
FIG. 7 is a flowchart of an exemplary method for transmitting a probe message and receiving probe response messages, in accordance with an embodiment.

FIG. 7 is a flowchart of an exemplary method for transmitting a probe message (e.g., the probe message 402 of FIG. 4) and receiving probe response messages (e.g., the first probe response message 406 or the second probe response message of FIG. 4) in accordance with an embodiment. In block 702, a processor (e.g., the processor 204) of a STA (e.g., the STA 106) generates the probe message 402 including a scrambling seed. Then in block 704, the processor 204 transmits the probe message 402. Then in block 706, the processor 204 receives the first probe response message 406 from each access point, which may be encoded with the scrambling seed. Then in block 710, the processor 204 receives the second probe response messages from each of the access points, which may include at least an address of the access point that sent the second probe response message. Then in block 712, the processor 204 may identify an access point to associate with based on the second probe response messages. Then in block 714, the processor 204 may generate an association request to transmit to the identified access point. Finally, in block 716, the processor 204 may transmit the association request to the identified access point.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

One having ordinary skill in the art may understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One having ordinary skill in the art may further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions may not be interpreted as causing a departure from the scope of the present disclosure.

The various illustrative logical blocks, modules, and circuits described in connection with the aspects disclosed herein and in connection with the figures may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above may also be included within the scope of computer-readable media. Additionally, the operations of a method or algorithm may reside as one or any combination or set of codes and instructions on a machine readable medium and computer-readable medium, which may be incorporated into a computer program product.

Any specific order or hierarchy of steps in any disclosed process is an example of a sample approach. Based upon design preferences, the specific order or hierarchy of steps in the processes may be rearranged while remaining within the scope of the present disclosure. The accompanying method claims present elements of the various steps in a sample order, and are not limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles, and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims may be performed in a different order and still achieve desirable results.

What is claimed is:

1. A station for identifying the presence of at least one access point to associate with, the station comprising a processor configured to:
    generate a probe message requesting a plurality of probe response messages for initiating a process for transmitting association information, the probe message including a scrambling seed, and the processor being configured to generate the scrambling seed using a standardized transformation of the probe message or a station address;
    transmit the probe message;
    receive a first probe response message from each access point, each first probe response message being encoded with the scrambling seed, each first probe response being received at the same time, and each first probe response message being identical;
    after the first probe response message is received, receive a second probe response message from each access point, each second probe response message including at least an address of the access point;
    identify an access point to associate with based on the second probe response messages;
    generate an association request for the identified access point; and
    transmit the association request to the identified access point.

2. The station of claim 1, the probe message further including an identifier of the station and the first probe response message further including the identifier of the station.

3. The station of claim 1, the probe message further including a request-to-send (RTS) frame comprising a destination address corresponding to a pre-defined address for scanning a channel.

4. The station of claim 1, the second probe response message including at least one of a clear-to-send (CTS) frame, an acknowledgment (ACK) frame, and a PHY layer preamble comprising a length field having a value of zero.

5. A processing circuit configured to perform a method for identifying the presence of at least one access point to associate with, the method comprising:
    generating a probe message requesting a plurality of probe response messages for initiating a process for transmitting association information, the probe message including a scrambling seed, and the scrambling seed being generated using a standardized transformation of the probe message or a station address;
    transmitting the probe message;
    receiving a first probe response message from each access point, each first probe response message being encoded with the scrambling seed, each first probe response being received at the same time, and each first probe response message being identical;
    receiving a second probe response message from each access point, each second probe response message including at least an address of the access point;
    identifying an access point to associate with based on the second probe response messages;
    generating an association request for the identified access point; and
    transmitting the association request to the identified access point.

6. The method of claim 5, the probe message further including an identifier of the station and the first probe response message further including the identifier of the station.

7. The method of claim 5, the probe message further including a request-to-send (RTS) frame comprising a destination address corresponding to a pre-defined address for scanning a channel.

8. The method of claim 5, the second probe response message including at least one of a clear-to-send (CTS) frame, an acknowledgment (ACK) frame, and a PHY layer preamble comprising a length field having a value of zero.

9. An apparatus for identifying the presence of at least one access point to associate with, the apparatus comprising:
    means for generating a probe message requesting a plurality of probe response messages for initiating a process for transmitting association information, the probe message including a scrambling seed, the means for generating being configured to generate the scrambling seed using a standardized transformation of the probe message or a station address;

means for transmitting the probe message;

means for receiving a first probe response message from each access point, each first probe response message being encoded with the scrambling seed, each first probe response being received at the same time, and each first probe response message being identical;

means for receiving a second probe response message from each access point, each second probe response message including at least an address of the access point;

means for identifying an access point to associate with based on the second probe response messages;

means for generating an association request for the identified access point; and means for transmitting the association request to the identified access point.

10. The apparatus of claim 9, the probe message further including an identifier of the station and the first probe response message further including the identifier of the station.

11. The apparatus of claim 9, the probe message further including a request-to-send (RTS) frame comprising a destination address corresponding to a pre-defined address for scanning a channel.

12. The apparatus of claim 9, the second probe response message including at least one of a clear-to-send (CTS) frame, an acknowledgment (ACK) frame, and a PHY layer preamble comprising a length field having a value of zero.

* * * * *